US008744232B2

(12) United States Patent
Lee

(10) Patent No.: US 8,744,232 B2
(45) Date of Patent: Jun. 3, 2014

(54) METHOD FOR CONTROLLING VIDEO RECORDER, AND VIDEO RECORDER ADOPTING THE METHOD

(75) Inventor: Young-ki Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 391 days.

(21) Appl. No.: 12/709,164

(22) Filed: Feb. 19, 2010

(65) Prior Publication Data
US 2010/0310236 A1 Dec. 9, 2010

(30) Foreign Application Priority Data
Jun. 4, 2009 (KR) .................. 10-2009-0049476

(51) Int. Cl.
H04N 5/77 (2006.01)
(52) U.S. Cl.
USPC .......................... 386/224; 386/225
(58) Field of Classification Search
None
See application file for complete search history.

(56) References Cited

U.S. PATENT DOCUMENTS

2004/0228609 A1* 11/2004 Nakamura ................. 386/46
2006/0203012 A1* 9/2006 Nakajima .................. 345/629
2007/0070408 A1* 3/2007 Ono et al. ................. 358/1.15
2007/0136208 A1* 6/2007 Hamashima et al. ........ 705/62
2007/0199076 A1* 8/2007 Rensin et al. ............... 726/27
2008/0310044 A1* 12/2008 Fujita et al. ................. 360/55

FOREIGN PATENT DOCUMENTS

| CN | 101243688 A | 8/2008 |
| JP | 08-032927 A | 2/1996 |
| JP | 2002-125188 A | 4/2002 |
| JP | 2006-129189 A | 5/2006 |
| KR | 10-2005-0015742 A | 2/2005 |

OTHER PUBLICATIONS

Communication dated Feb. 22, 2013, issued by the State Intellectual Property Office of the People's Republic of China in counterpart Chinese Application No. 201010192888.5.

* cited by examiner

Primary Examiner — William C Vaughn, Jr.
Assistant Examiner — Eileen Adams
(74) Attorney, Agent, or Firm — Sughrue Mion, PLLC

(57) ABSTRACT

A video recorder connected to a plurality of cameras and a plurality of client devices and a method of controlling the video recorder are provided. The method includes: setting a plurality of buffers, in a memory of the video recorder, corresponding to the plurality of cameras, respectively, and setting a plurality of positions in at least one buffer of the buffers for loading image data input from a corresponding camera of the plurality of cameras; loading, in the at least one buffer, the image data on given positions of the plurality of positions; and transmitting the loaded image data to the plurality of client devices so that each of the plurality of client devices receives the image data input from a same corresponding camera.

22 Claims, 5 Drawing Sheets

METHOD FOR CONTROLLING VIDEO RECORDER, AND VIDEO RECORDER ADOPTING THE METHOD

CROSS-REFERENCE TO RELATED PATENT APPLICATIONS

This application claims priority from Korean Patent Application No. 10-2009-0049476, filed on Jun. 4, 2009, in the Korean Intellectual Property Office, the disclosure of which is incorporated herein in its entirety by reference.

SUMMARY

Methods and apparatuses consistent with the exemplary embodiments concept relate to a video recorder and controlling the same, and more particularly, to a video recorder which stores and transmits frame data received by channels while the frame data is loaded on a volatile memory, and a method of controlling the same.

A network video recorder (NVR) is an example of a video recorder having a main control unit and a volatile memory, and storing and transmitting frame data received by channels while loading the frame data on the volatile memory. For the network video recorder, monitoring cameras are set by channels and the frame data transmitted from each monitoring camera is received through a network. The frame data received by channels is stored and transmitted while being loaded on the volatile memory for buffering. For example, the frame data loaded on the volatile memory by channels is transmitted to client computers connected to a network, as transmission targets. Also, the frame data loaded on the volatile memory by channels is stored in a hard disk drive (HDD).

According to one or more exemplary embodiments of the present inventive concept, there is provided a method for controlling a video recorder, by which moving picture data of the same channel is effectively transmitted to a plurality of client computers and also the amount of data loaded on a volatile memory is efficiently reduced.

According to an aspect of an exemplary embodiment, there is provided a method for controlling a video recorder including a memory and connected to a plurality of cameras and a plurality of client devices. The method may include: setting a plurality of buffers, in the memory, corresponding to the plurality of cameras, respectively, and setting a plurality of positions in at least one buffer of the buffers for loading image data input from a corresponding camera of the cameras; in the at least one buffer, loading the image data on given positions of the positions; and transmitting the loaded image data to the client devices so that each of the client devices receives the image data input from the same corresponding camera.

According to an aspect of an exemplary embodiment, there is provided a video recorder connected to a plurality of cameras and a plurality of client devices. The video recorder may include: a memory comprising a plurality of buffers, corresponding to the plurality of cameras, respectively, at least one of which buffers comprises a plurality of positions where image data input from a corresponding camera of the cameras is loaded; and a control unit which loads the image data on given positions of the positions, and transmits the loaded image data to the client devices so that each of the client devices receives the image data input from the same corresponding camera.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

Figure 1:
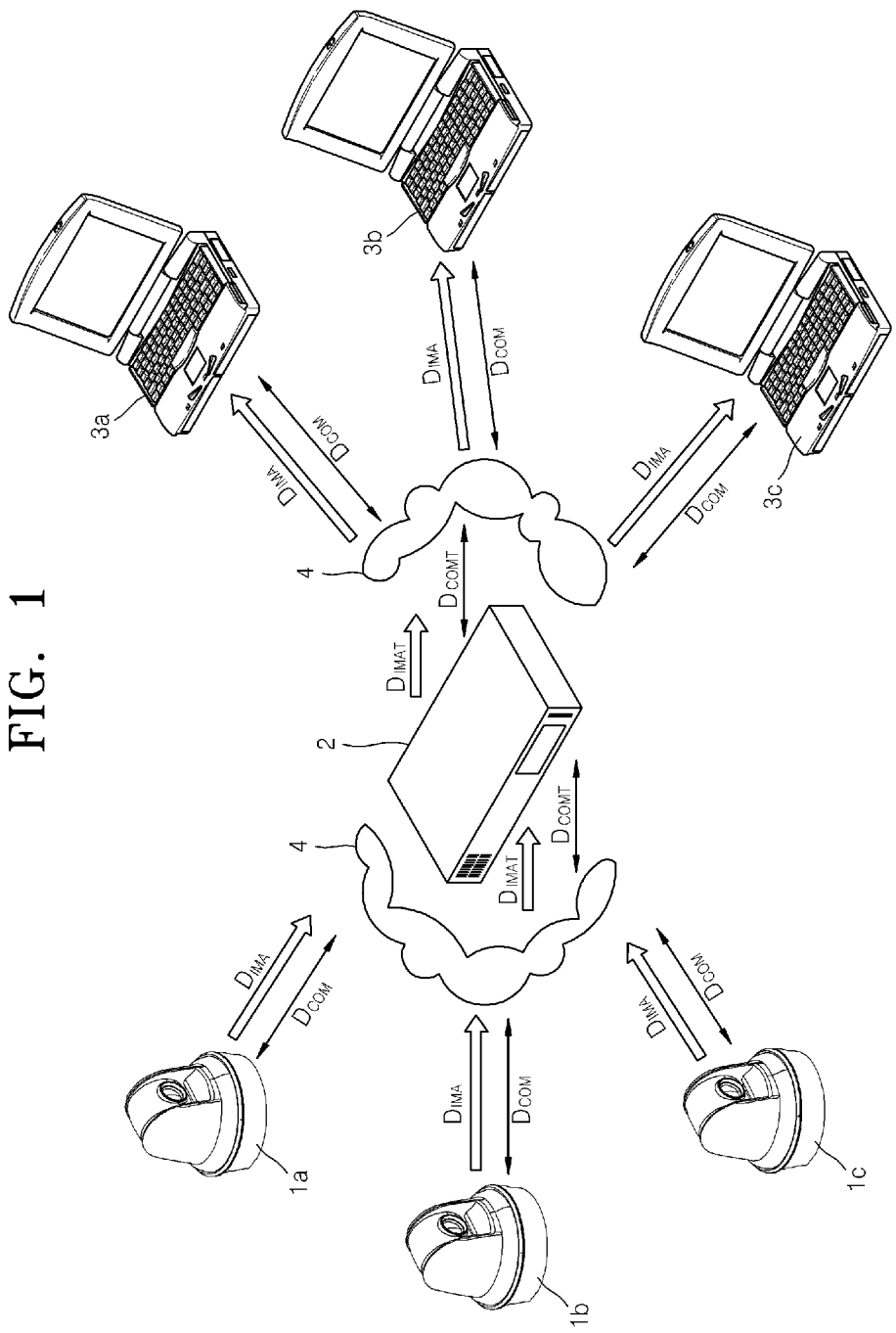
FIG. 1 illustrates a monitoring system using a network video recorder that is used as a video recorder according to an exemplary embodiment.

Hereinafter, exemplary embodiments will be described in detail with reference to the attached drawings. Like reference numerals in the drawings denote like elements.

FIG. 1 illustrates a monitoring system using a network video recorder 2 that is used as a video recorder according to an exemplary embodiment. In FIG. 1, a reference numeral $D_{IMA}$ denotes moving picture data channels in which moving picture data output from each of monitoring cameras 1a, 1b, and 1c is input to a network 4, for example, the Internet, and moving picture data output from the network 4 is input to each of client computers 3a, 3n, and 3c. Reference label $D_{COM}$ denotes communication channels between each of the monitoring cameras 1a, 1b, and 1c and the network 4, and between the network 4 and each of the client computers 3a, 3b, and 3c. Reference label $D_{IMAT}$ denotes a compound moving picture data channel in which compound moving picture data is input from the network 4 to the video recorder 2, and compound moving picture data is output from the video recorder 2 to the network 4. Reference label $D_{COMT}$ denotes a compound communication channel between the video recorder 2 and the network 4.

Referring to FIG. 1, the video recorder 2 is connected to the monitoring cameras 1a, 1b, and 1c and the client computers 3a, 3b, and 3c as transmission targets, via the network 4, for example, the Internet. The monitoring cameras 1a, 1b, and 1c communicate with the video recorder 2 through the communication channel $D_{COM}$ and transmit moving picture data in live-view to the video recorder 2 through the moving picture data channels $D_{IMA}$. That is, since the monitoring cameras 1a, 1b, and 1c are set by channels, the frame data from each of the monitoring cameras 1a, 1b, and 1c is periodically input to the video recorder 2 via the network 4, for example, the Internet.

The video recorder 2 according to the present exemplary embodiment includes a main control unit and a volatile memory, and stores and transmits frame data received by channels while loading the frame data on the volatile memory. That is, the video recorder 2 transmits moving picture data loaded on the volatile memory by channels to the client computers 3a, 3b, and 3c as transmission targets, and also stores the moving picture data on a hard disk drive as a recording medium.

Figure 2:
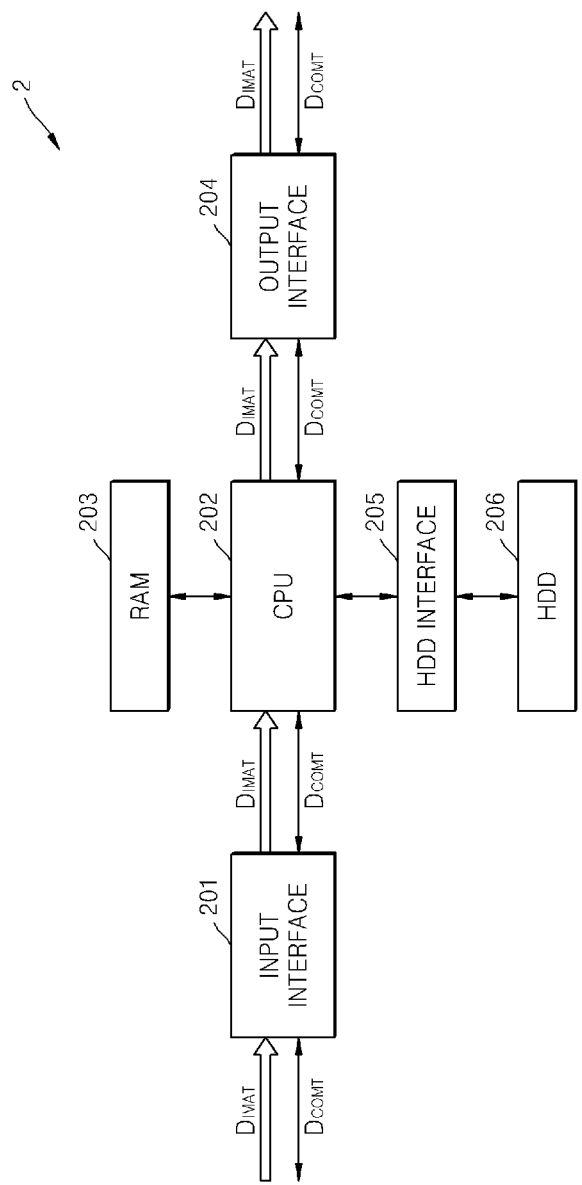
FIG. 2 is a block diagram showing the internal structure of the network video recorder of FIG. 1, according to an exemplary embodiment.

FIG. 2 is a block diagram showing the internal structure of the video recorder 2 of FIG. 1. Referring to FIG. 2, the video recorder 2 according to the present exemplary embodiment includes an input interface 201, a central processing unit (CPU) 202, a random access memory (RAM) 203 as the volatile memory, an output interface 204, a hard disk drive (HDD) interface 205, and an HDD 206.

Referring to FIGS. 1 and 2, in the internal structure and operation of the video recorder 2 according to the present exemplary embodiment, the compound moving picture data channel $D_{IMAT}$ and the compound communication channel $D_{COMT}$ input from the monitoring cameras 1a, 1b, and 1c through the network 4 are input to the CPU 202 via the input interface 201.

While loading frame data received by channels on the RAM 203, the CPU 202 stores and transmits the frame data. That is, the CPU 202 transmits motion picture data loaded on the RAM 203 by channels, to the client computers 3a, 3b, and 3c via the output interface 204, and also stores the moving picture data on the HDD 206 via the HDD interface 205. The HDD interface 205 adopts a well-known serial advanced technology attachment (SATA) standard.

According to an exemplary embodiment, the CPU 202 sets a ring buffer, in which loading positions of the frame data form a circular ring, by channels, so that the frame data may circularly move in the RAM 203 provided as the volatile memory. The CPU 202 also sets transmission targets by loading positions in the ring buffer, and a reference time during which any one frame data can exist on the RAM 203. The reference time is set to be longer than a period for storing the frame data in the HDD 206.

When there is frame data for which transmission and storing are completed, and a loading time during which the frame data exists in the ring buffer exceeds the reference time, the CPU 202 removes the frame data from the ring buffer.

Figure 3:
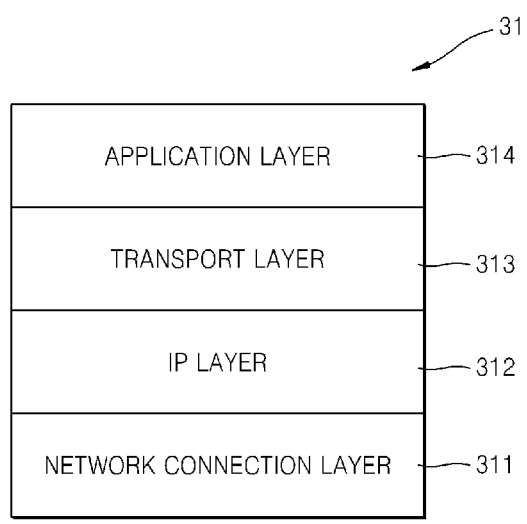
FIG. 3 is a block diagram showing layers of communication control used by a CPU as the main control unit of FIG. 1, according to an exemplary embodiment.

Referring to FIG. 3, layers of communication control used in the CPU 202 as the main control unit of FIG. 2 include a network connection layer 311, an Internet protocol (IP) layer 312, a transport layer 313, and an application layer 314. That is, the CPU 202 performs communication by using four layers according to transmission control protocol/Internet protocol (TCP/IP).

Referring to FIGS. 2 and 3, the network connection layer 311 forms a frame by adding a frame header and a trailer for cyclic redundancy check (CRC) to a packet from an upper layer, that is, the IP layer 312. The frame is converted into a bit stream to be input to the output interface 204. The IP layer 312 adds an IP header for routing to a segment from an upper layer, that is, the transport layer 313. The IP header includes information about a source route or a destination route. The transport layer 313 divides data from an upper layer, that is, the application layer 314 into segments having appropriate sizes and provides session between communications. The transport layer 313 performs start, maintenance or termination of connection between communications. The application layer 314 provides a standard interface so that an application may provide a network service.

Figure 4:
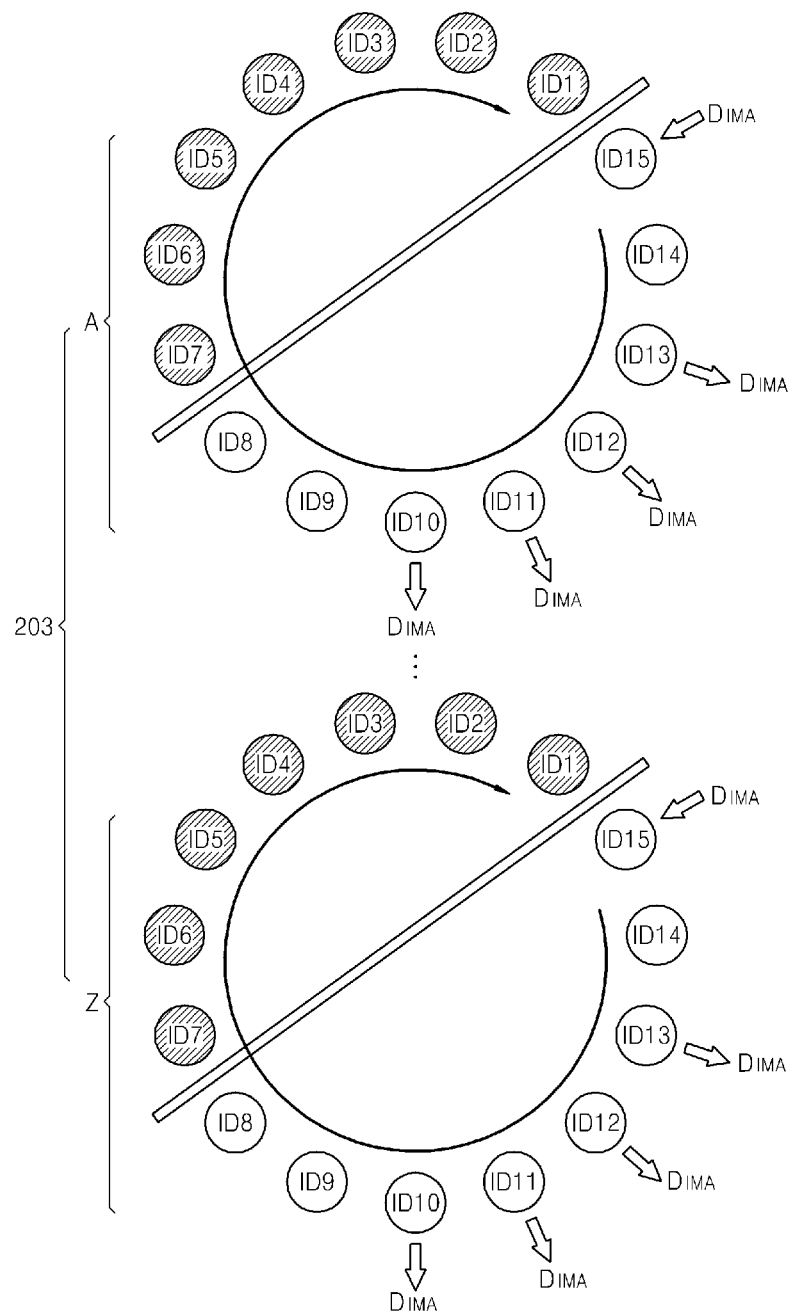
FIG. 4 illustrates a method for controlling a RAM as a volatile memory by the main control unit of FIG. 2, according to an exemplary embodiment.

FIG. 4 illustrates a method for controlling the RAM 203 as the volatile memory by the CPU 202 as the main control unit of FIG. 2. Referring to FIGS. 2 and 4, the CPU 202 sets ring buffers A-Z, by channels, in which loading positions ID1-ID15 of frame data form a circular ring so that the frame data may circularly move in the RAM 203 as the volatile memory. That is, the ring buffers A-Z are set to correspond to respective monitoring cameras, connected to the video recorder 2, including the monitoring cameras 1a, 1b, and 1c.

Although each of the ring buffers A-Z is set to have 15 loading positions ID1-ID15, more loading positions may be set. Also, although the ring buffer A and the ring buffer Z are set to be identical to each other in FIG. 4, the ring buffer A and the ring buffer Z may be set to be different from each other. In the ring buffers A-Z, periodical frame data of moving picture corresponding to each of the ring buffers is set to be input to the $15^{th}$ loading position ID15 through the moving picture channels $D_{IMA}$.

Also, the CPU 202 sets transmission targets by loading positions of the ring buffers A-Z by a user. For example, in the ring buffer A, the $1^{st}$ to $4^{th}$ client computers are set as the transmission targets respectively to the $10^{th}$ to $13^{th}$ loading positions ID10-ID13. Also, in the ring buffer Z, the $1^{st}$ to $4^{th}$ client computers are set as the transmission targets respectively to the $10^{th}$ to $13^{th}$ loading positions ID10-ID13. As described above, although the ring buffer A and the ring buffer Z are set to be identical to each other, the ring buffer A and the ring buffer Z may be set to be different from each other.

Accordingly, in the transmission of moving picture data of the same channel to a plurality of client computers, since the moving picture data may be individually transmitted at the different loading positions ID10-ID13 due to the movement of the position of the loaded frame data, the transmission rate of the moving picture data may be accurately determined with respect to each of the client computers. Thus, the moving picture data of the same channel may be effectively transmitted to a plurality of client computers.

The CPU 202 sets the reference time during which any one frame data exists on the RAM 203, by the user. As described above, the reference time is set to be longer than a period for storing the frame data in the HDD 206. When there is frame data for which transmission and storing are completed, and a loading time during which the frame data exists in the ring buffer exceeds the reference time, the CPU 202 removes the frame data from the ring buffers A-Z.

Referring to FIG. 4, the frame data input at the $15^{th}$ loading position ID15 circularly moves in a direction indicated by an arrow, that is, clockwise, and that the data moved from the $8^{th}$ loading position ID8 to the $7^{th}$ loading position ID7 is removed. Since the frame data is sequentially removed, no frame data exist at the $1^{st}$ to $7^{th}$ loading positions ID1-ID7. Thus, the amount of data loaded on the volatile memory may be efficiently reduced.

Figure 5:
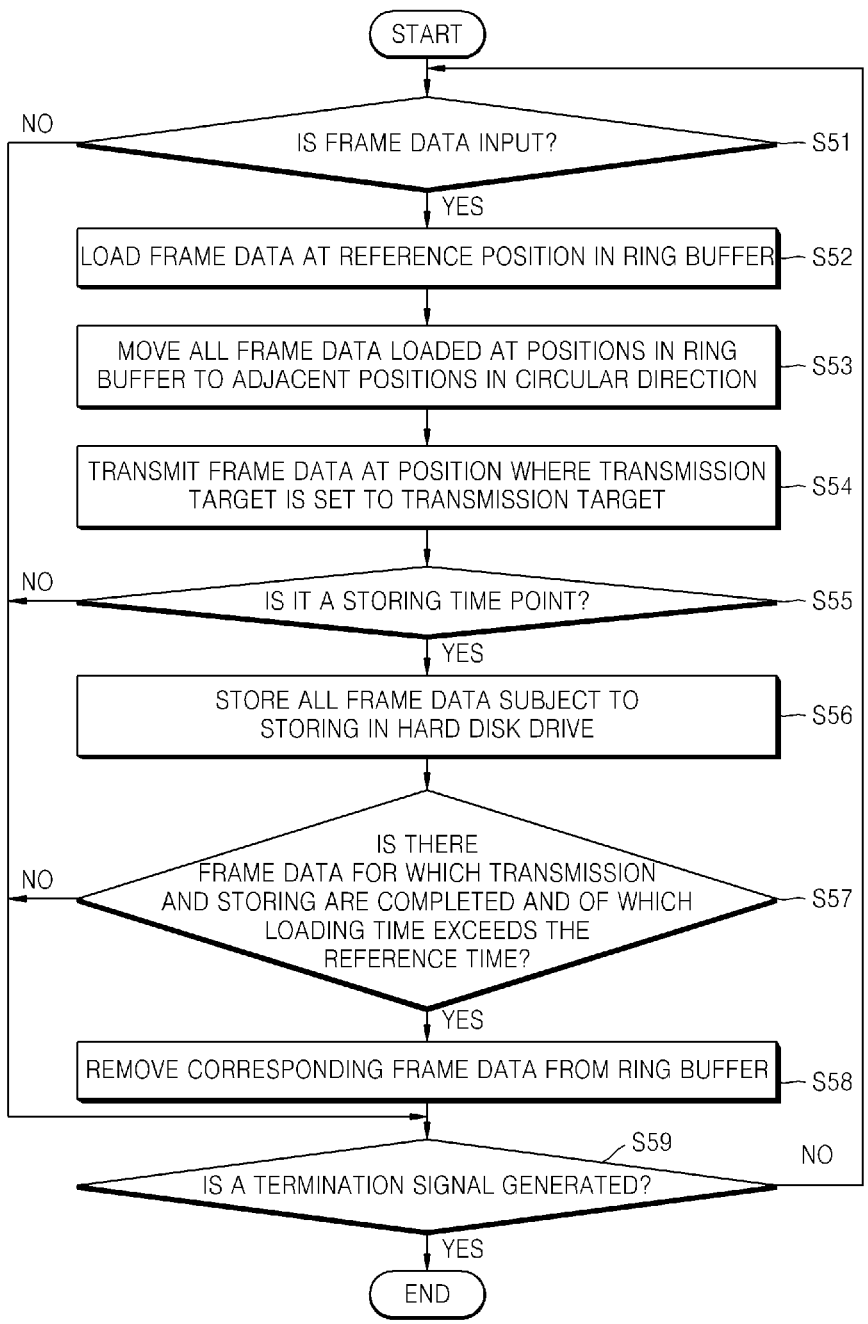
FIG. 5 is a flowchart for explaining a control algorithm of the main control unit of FIG. 2, including the control method of FIG. 4, according to an exemplary embodiment.

FIG. 5 is a flowchart for explaining a control algorithm of the CPU 202 as the main control unit of FIG. 2, including the control method of FIG. 4. Referring to FIGS. 2, 4 and 5, in the control algorithm of the CPU 202, when frame data of a channel is input (S51), the CPU 202 loads the frame data at the $15^{th}$ loading position ID15 that is a reference position in a ring buffer, for example, the ring buffer A, corresponding to the channel (S52).

Next, the CPU 202 moves all frame data loaded at the respective positions ID1-ID15 in a ring buffer, for example, the ring buffer A, corresponding to the channel, to next positions circularly in a direction indicated by an arrow of FIG. 4, that is, clockwise (S53). The CPU 202 transmits the frame data of the positions ID10-ID13, where transmission targets are set, in a ring buffer, for example, the ring buffer A, to the transmission target (S54).

Next, the CPU 202 stores all frame data on the RAM 203 subject to storing, in the HDD 206 via the HDD interface 205 at a periodic storage time point (S55 and S56). When there is frame data for which transmission and storing are completed, and a loading time during which the frame data exists in the ring buffers exceeds the reference time, the CPU 202 removes the frame data from the ring buffers A-Z (S57 and S58).

Thus, the amount of data loaded on the volatile memory may be efficiently reduced. All operations are repeated until a termination signal is generated (S59).

As described above, in the method for controlling a video recorder and a video recorder adopting the method according to the exemplary embodiments, the ring buffers in which the loading positions of frame data form a circular ring are set by channels so that the frame data may circularly move in the volatile memory, and transmission targets are set by loading positions in each ring buffer.

Accordingly, when moving picture data of the same channel is transmitted to a plurality of client computers, the moving picture data may be individually transmitted from different loading positions due to the movement of the position of the loaded frame data so that the transmission rate of the moving picture data can be individually and accurately determined with respect to each of the client computers. Thus, the moving picture data of the same channel can be effectively transmitted to the client computers.

Also, when there is frame data for which transmission and storing are completed, and a loading time during which the frame data exists in the ring buffer exceeds the reference time, the frame data is removed from the ring buffer. Thus, the amount of data loaded on the volatile memory may be efficiently reduced.

While exemplary embodiments have been particularly shown and described, it will be understood by those skilled in the art that various changes in form and details may be made therein without departing from the spirit and scope of the inventive concept as defined by the appended claims.

What is claimed is:

1. A method for controlling a video recorder connected to a plurality of cameras and a plurality of client devices, the method comprising:
   setting a plurality of buffers, in a memory of the video recorder, to receive respective image data from the plurality of cameras;
   setting a plurality of positions in a buffer among the plurality of buffers to load image data which comprises a plurality of image units and is input from a camera among the plurality of cameras;
   assigning specific positions among the plurality of positions in the buffer to specific client devices among the plurality of client devices, respectively, and moving the plurality of image units across the plurality of positions so that, if specific image units among the plurality of image units are moved to the specific positions, the specific image units are transmitted to the specific client devices, respectively, so that the specific client devices respectively receive the specific image units input from the same camera.

2. The method of claim 1, further comprising, upon or after the transmitting the specific image units moved to the specific positions to the specific client devices, respectively, storing the transmitted specific image units in another memory connected to the video recorder,
   wherein the memory is a random access memory (RAM).

3. The method of claim 1, further comprising:
   setting a reference time, for an image unit of the plurality of image units, during which the image unit can exist in the buffer;
   removing the image unit from the buffer if a time during which the image unit exists in the buffer exceeds the reference time; and
   transmitting the image unit to one of the specific client devices, and storing the transmitted image unit in another memory connected to the video recorder,
   wherein the reference time is set to be longer than a time between storing the image unit and storing a next image unit among the plurality of image units in the other memory.

4. The method of claim 3, wherein the moving the plurality of image units across the plurality of positions comprises:
   loading a first image unit on an initial position among the plurality of positions; and
   moving the first image unit to a next position among the plurality of positions while a second image unit is loaded on the initial position,
   wherein the transmitting the specific image units moved to the specific positions to the specific client devices, respectively, comprises transmitting the first and second image units to first and second client devices among the specific client devices, respectively, if the first and second image units move to the specific positions, respectively, and
   wherein if the first and second image units move to predetermined positions, different from the specific positions, among the plurality of positions, the first and second image units are removed from the buffer after being transmitted to the first and second client devices, respectively.

5. The method of claim 1, further comprising:
   removing from the buffer an image unit among the plurality of image units if the image unit moves to a predetermined position, not included in the specific positions, among the plurality of positions.

6. The method of claim 1, wherein the moving the plurality of image units across the plurality of positions comprises:
   loading a first image unit on an initial position among the plurality of positions; and
   moving the first image unit to a next position among the plurality of positions while a second image unit is loaded on the initial position, and
   wherein the transmitting the specific image units moved to the specific positions to the specific client devices, respectively, comprises transmitting the first and second image units to first and second client devices among the specific devices, respectively, if the first and second image units move to the specific positions, respectively.

7. The method of claim 6, wherein if the first and second image units move to predetermined positions, different from the specific positions, among the plurality of positions, the first and second image units are removed from the buffer after being transmitted to the first and second client devices, respectively.

8. The method of claim 1, wherein, in the transmitting the specific image units moved to the specific positions to the specific client devices, a first image unit moved to a first position among the specific positions is transmitted to a first client device among the specific client devices, and a second image unit moved to a second position among the specific positions is transmitted to a second client device among the specific client devices.

9. The method of claim 8, wherein the first and second units are moved to the first and second positions, respectively, at a same time, and transmitted to the first and second client devices, respectively, at the same time.

10. The method of claim 1, wherein the moving the plurality of image units across the plurality of positions comprises:
    loading a first image unit on an initial position among the plurality of positions; and
    moving the first image unit to a next position among the plurality of positions while a second image unit is loaded on the initial position,
    wherein the plurality of positions set in the buffer form a ring.

11. A video recorder connected to a plurality of cameras and a plurality of client devices, the video recorder comprising:
- a memory comprising a plurality of buffers, receiving respective image data from the plurality of cameras, a buffer among the plurality of buffers comprising a plurality of positions where image data which comprises a plurality of image units and is input from a camera among the plurality of cameras is loaded; and
- a control unit which is configured to assign specific positions among the plurality of positions in the buffer to specific client devices among the plurality of client devices, respectively, and move the plurality of image units across the plurality of positions so that, if specific image units among the plurality of image units are moved to the specific positions, the specific image units are transmitted to the specific client devices, respectively, so that the specific client devices respectively receive the specific image units input from the same camera.

12. The video recorder of claim 11, wherein upon or after the transmission the specific image units moved to the specific positions to the specific client devices, respectively, the control unit stores the transmitted specific image units in another memory connected to the video recorder,
wherein the memory is a random access memory (RAM).

13. The video recorder of claim 11, wherein the control unit sets a reference time, for an image unit of the plurality of image units, during which the image unit can exist in the buffer,
wherein the control unit removes the image unit from the buffer if a time during which the image unit exists in the buffer exceeds the reference time,
wherein the control unit transmits the image unit to one of the specific client devices, and stores the transmitted image unit in another memory connected to the video recorder, and
wherein the reference time is set to be longer than a time between storing the image unit and storing a next image unit among the plurality of image units in the other memory.

14. The video recorder of claim 13, wherein, to move the plurality of image units across the plurality of positions, the control unit loads a first image unit on an initial position among the plurality of positions, and moves the first unit to a next position among the plurality of positions while a second image unit is loaded on the initial position,
wherein, for transmitting the specific image units moved to the specific positions to the specific client devices, respectively, the control unit transmits the first and second image units to first and second client devices among the specific client devices, respectively, if the first and second units move to the specific positions, respectively, and
wherein if the first and second image units move to predetermined positions, different from the specific positions, among the plurality of positions, the control unit removes the first and second image units from the buffer after the first and second image units are transmitted to the first and second client devices, respectively.

15. The video recorder of claim 11, wherein, to move the plurality of image units across the plurality of positions, the control unit loads a first image unit on an initial position among the plurality of positions, and moves the first unit to a next position among the plurality of positions while a second image unit is loaded on the initial position, and
wherein, for transmitting the specific image units moved to the specific positions to the specific client devices, respectively, the control unit transmits the first and second image units to first and second client devices among the specific client devices, respectively, if the first and second units move to the specific positions, respectively.

16. The video recorder of claim 15, wherein if the first and second image units move to predetermined positions, different from the specific positions, among the plurality of positions, the control unit removes the first and second image units from the buffer after the first and second image units are transmitted to the first and second client devices, respectively.

17. The video recorder of claim 11, wherein, for transmitting the specific image units moved to the specific positions to the specific client devices, respectively, the control unit transmits a first image unit moved to a first position among the specific positions to a first client device among the specific client devices, and transmits a second image unit moved to a second position among the specific positions to a second client device among the specific client devices.

18. The video recorder of claim 17, wherein the control unit moves the first and second units to the first and second positions, respectively, at a same time, and then, transmits the first and second units to the first and second client devices, respectively, at the same time, and
wherein the first unit of the image data is different from the second unit of the image.

19. The video recorder of claim 11, wherein, to move the plurality of image units across the plurality of positions, the control unit loads a first image unit on an initial position among the plurality of positions, and moves the first image unit to a next position among the plurality of positions while a second image unit is loaded on the initial position,
wherein the plurality of positions set in the buffer form a ring.

20. A video apparatus comprising:
- a memory comprising at least one buffer, among which a buffer comprises a plurality of positions where image data, comprising a plurality of image units, input from an image capturing device is loaded; and
- a controller which:
  - moves specific image units, among the plurality of image units, existing in first positions among the plurality of positions, respectively, to second positions among the plurality of positions, respectively, if a new image unit is input to the buffer from the image capturing device; and
  - removes an image unit among the specific image units which moves to a predetermined position among the plurality of positions as the specific image units are moved to the second positions,
- wherein the controller assigns specific positions among the plurality of positions in the buffer to a plurality of specific client devices, respectively, and moves the plurality of image units across the plurality of positions so that, if specific image units among the plurality of image units are moved to the specific positions, the specific image unit are transmitted to the specific client devices, respectively, so that the specific client devices respectively receive the specific image units input from the same camera.

21. The apparatus of claim 20, wherein the controller removes another image unit among the specific image units from the buffer if a time period during which the other image unit has existed in the buffer exceeds a reference time period.

22. The apparatus of claim 20, the controller transmits the specific image units to the specific client devices, respectively, if the second positions to which the specific image units move are the specific positions among the plurality of positions in the buffer so that the specific client devices receive the specific image units, respectively.

* * * * *